Patented June 1, 1943

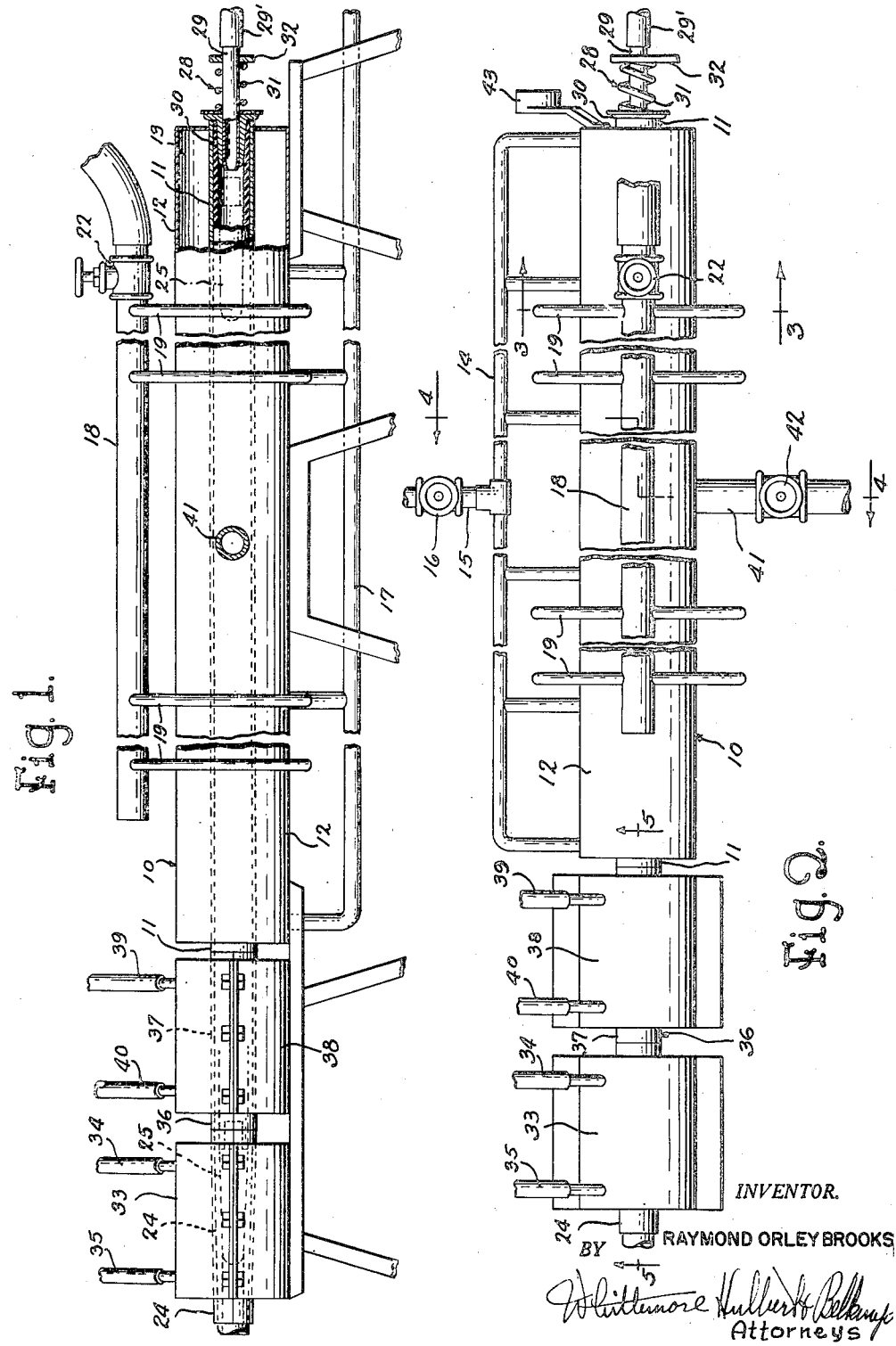

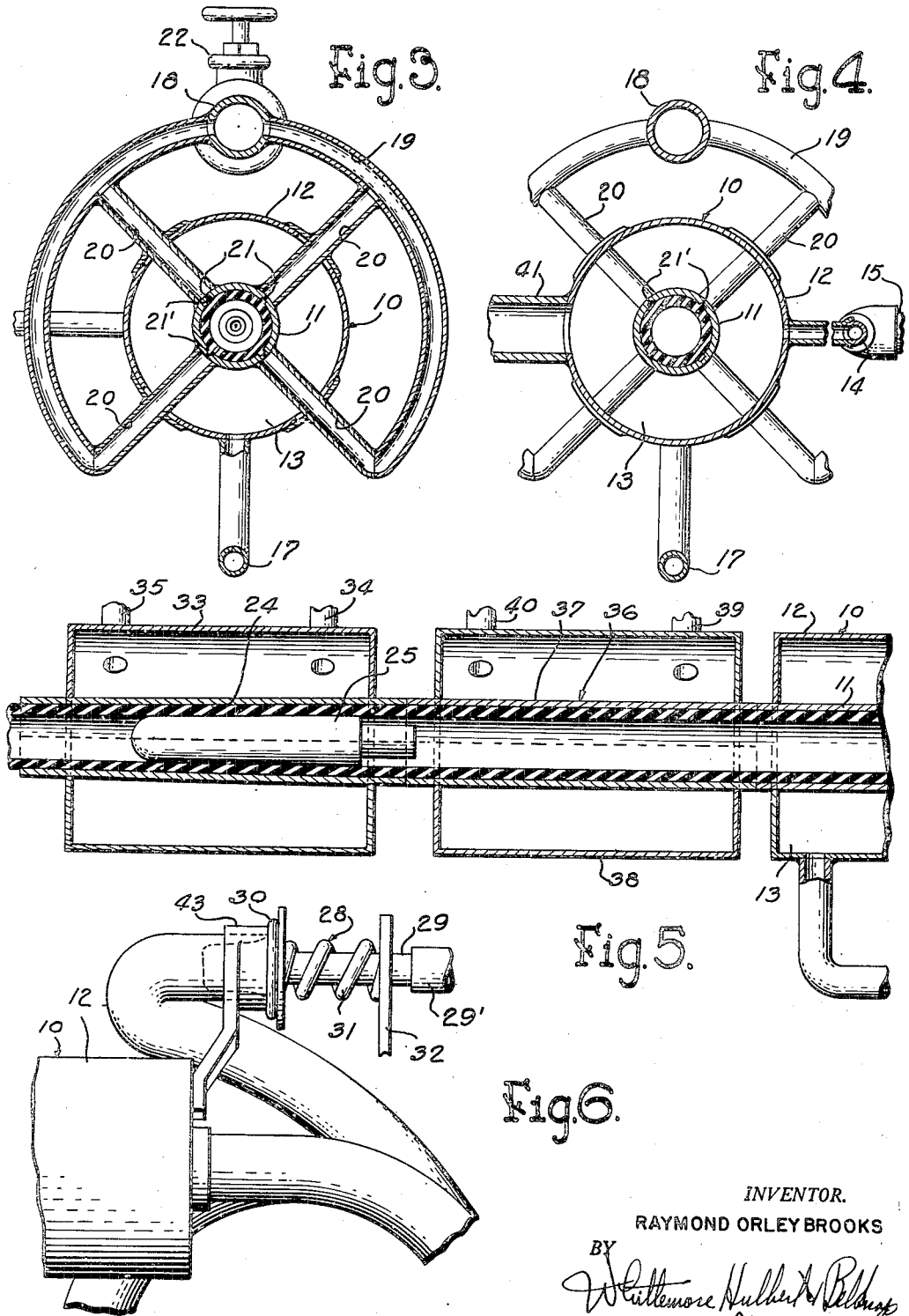

2,320,564

UNITED STATES PATENT OFFICE 2,320,564

METHOD AND APPARATUS FOR MANUFACTURING TUBING

Raymond Orley Brooks, Pontiac, Mich., assignor to Baldwin Rubber Company, Pontiac, Mich., a corporation of Michigan Application February 2, 1942, Serial No. 429,326

11 Claims. (Cl. 18—6)

This invention relates to a method and apparatus for forming tubing or hose from a vulcanizable material.

It is one of the principal objects of this invention to simplify, render more efficient and improve generally the manufacture of a continuous length of vulcanized hose or tubing by progressively curing successive portions of a length of uncured stock. In accordance with this invention a continuous length of uncured vulcanizable stock is advanced through an elongated tubular vulcanizing chamber by a step by step movement and the stock in the chamber is cured during the intervals of rest of the stock. As a result, a continuous length of uncured tubular stock at the entrant end of the chamber may be readily formed into a continuous length of vulcanized tubing at the delivery end of the chamber.

Another object of this invention is to cure the length of stock in the chamber by urging the wall of the tubular stock into contact with the adjacent wall of the chamber during the intervals of rest of the stock and by heating the wall of the chamber to the temperature required to cure the stock.

Still another object of this invention is to maintain the outer surface of the length of stock into engagement with the adjacent wall of the vulcanizing chamber during the curing operation and, at the same time, test the length of stock previously cured by introducing fluid under pressure into the stock through the leading end of the stock.

While the introduction of fluid under pressure into the stock during the curing operation serves to urge the walls of the length of tubular stock in the vulcanizing chamber outwardly against the adjacent wall of the chamber, nevertheless, provision is made herein for insuring intimate contact of the stock with the wall of the chamber by creating a suction between the wall of the chamber and the adjacent wall of the stock in the chamber.

A further object of this invention is to cool the wall of the chamber subsequent to each vulcanizing operation so as to facilitate movement of the uncured stock into the tubular chamber. In accordance with this invention cooling of the chamber is effected by circulating a cooling medium in heat conducting relation to the wall of the chamber after each curing operation.

A still further object of this invention is to provide a vulcanizing chamber having a jacket surrounding the tubular wall of the chamber and having provision for alternately introducing into the jacket a fluid heated to the temperature required for curing the stock and a cooling medium.

The foregoing, as well as other objects, will be made more apparent as this description proceeds, especially when considered in connection with the accompanying drawings, wherein:

Figure 1 is a semi-diagrammatic side elevational view, partly broken away, of the vulcanizing chamber and associated parts;

Figure 2 is a top plan view of the construction shown in Figure 1;

Figure 3 is a cross sectional view taken on the line 3—3 of Figure 2;

Figure 4 is a sectional view taken on the line 4—4 of Figure 2;

Figure 5 is a sectional view taken on the line 5—5 of Figure 2; and

Figure 6 is a plan view of the delivery end of the vulcanizing chamber.

As indicated above, this invention is primarily concerned with the manufacture of tubing formed of a vulcanizable material, such as rubber or any one of the various synthetic rubbers. Broadly stated, the method of manufacture comprises progressively curing predetermined lengths of a continuous length of uncured tubular stock by introducing successive lengths of the stock into a vulcanizing chamber and by heating the stock during the period it is retained in the chamber. More particularly, a continuous length of uncured tubing is advanced by a step by step movement through an elongated vulcanizing chamber and the length of stock in the chamber is vulcanized during the intervals of rest of the stock in a manner to obtain a continuous length of vulcanized tubing at the delivery end of the chamber.

The detailed steps of the method of manufacturing tubing in accordance with this invention will be more fully understood upon considering a description of one type of apparatus which has been found satisfactory in commercial use. While the apparatus possesses numerous novel features, nevertheless, it is to be understood that the method of manufacture is not limited to the use of the specific apparatus shown herein and about to be described.

With the above in view, reference will now be made to the drawings wherein it will be noted that the reference character 10 designates generally a vulcanizing chamber assembly comprising an elongated tube 11 having an inside diameter corresponding to the specified outside diameter of the tubing to be manufactured. The elongated tube 11 of the vulcanizing chamber is shown in Figure 3 as surrounded by a sheet metal casing 12 of substantially greater diameter than the tube 11 and cooperating with the tube 11 to form an annular jacket or chamber 13 around the tube 11 throughout the length of the latter. The jacket 13 communicates at longitudinally spaced points with a supply line 14 and, in the present instance, the supply line 14 communicates with a source of steam by means of a conduit 15. A suitable control valve 16 is arranged in the conduit 15 and when opened permits steam to flow into the jacket 13 around the tube 11. In this way the tube 11 is heated to the temperature required to vulcanize a length of uncured stock in the tube 11.

Upon reference to Figure 1, it will be noted that a second longitudinally extending conduit 17 communicates at spaced points with the jacket 13 at the bottom of the latter. The arrangement is such that the conduit 17 collects the fluid resulting from condensation of the steam in the jacket 13. The extremity or outlet end of the conduit 17 communicates with a suitable drain (not shown) and in this way disposes of the condensate in the jacket 13.

Inasmuch as the stock is vulcanized by heating the wall of the tube 11, it is important to maintain the stock in heat conducting relation with the inner surface of the elongated tube 11 during the curing operation. This is accomplished in the present instance by creating a suction between the stock and inner surface of the tube 11. In detail a suction conduit 18 is provided having one end communicating with the suction side of a suitable pump (not shown) and extending longitudinally of the vulcanizing chamber. Upon reference to Figure 3 it will be noted that the suction conduit 18 also communicates at longitudinally spaced points with arcuate chambers 19. Each of the arcuate chambers 19 communicates with the interior of the elongated tube 11 at points spaced equal distances from each other circumferentially of the tube 11. Referring again to Figure 3 it will be noted that a plurality of conduits 20 are associated with each arcuate chamber 19. The conduits 20 extend radially outwardly from the elongated tube 11 and project through the jacket 13. The outer ends of the conduits 20 communicate with the interior of the associated suction chamber 19 and the inner ends of the conduits 20 communicate with longitudinally extending grooves 21' formed in the inner surface of the elongated tube 11 through the medium of restricted ports 21.

A suitable valve 22 is located in the conduit 18 and when this valve is opened, a suction is created in the tube 11 throughout the length of the latter. As a result, the uncured stock in the tube 11 is drawn against the inner surface of the tube 11 and this is accomplished during the period the tube is heated by the steam in the jacket 13 so that the stock in the tube 11 is cured or vulcanized to the proper size.

In order to assist in holding the uncured stock against the inner surface of the elongated tube 11 during the vulcanizing operation, provision is made herein for introducing fluid under pressure into the stock. In cases where the wall of the stock is relatively thin, compressed air is employed and in cases where the wall of the stock is of substantial thickness, hydraulic fluid is preferably used. In general, the fluid under pressure is introduced into the end of the stock at the delivery end of the vulcanizing chamber and is prevented from flowing into the uncured length of stock beyond the entrant end of the vulcanizing chamber by a seal.

The seal comprises a chamber 24 and a tapered pin 25. The chamber 24 comprises two complementary parts, which when secured together, form an elongated tube. As shown in Figure 5, the tubular chamber 24 is supported at the entrant end of the vulcanizing chamber in axial alignment with the tube 11 and is adapted to receive the adjacent portion of the length of uncured stock. Upon reference to Figure 5 it will be noted that the chamber is tapered inwardly from the entrant end of the tube 11 and the degree of taper corresponds to the taper of the pin 25. The pin 25 is adapted to be inserted into the length of uncured stock in the tubular sealing chamber and coacts with the tapered wall of this chamber to clamp the stock in sealing engagement with the tapered wall of the chamber 24.

With the construction as thus far described, one end portion of the continuous length of uncured stock is inserted into the entrant end of the tube 11 and is pulled by a wire or, in some other manner, through the tube 11 to a position wherein the end of the uncured stock is substantially flush with the delivery end of the tube 11. During this operation the upper half of the tubular sealing chamber 24 is removed and the adjacent length of uncured stock is placed in the lower half of this chamber. The top half is then secured in place and the sealing pin 25 is inserted into the leading end of the uncured stock which has previously been described as located flush with the delivery end of the tube 11. Fluid under pressure is then introduced into the leading end of the uncured stock and the sealing pin 25 is forced by the fluid under pressure throughout the length of the stock in the tube 11 to a position in the sealing chamber 24. Inasmuch as the wall of the sealing chamber 24 and the pin 25 are correspondingly tapered, it follows that the adjacent length of uncured stock is intimately clamped throughout its circumference between the inner surface of the sealing chamber 24 and the exterior surface of the tapered pin 25. The above arrangement is such that the effectiveness of the seal is increased as the pressure in the stock in the tube 11 is increased. As a result, the fluid under pressure introduced into the stock at the delivery end of the tube 11 is prevented from escaping into the length of uncured stock beyond the entrant end of the vulcanizing chamber.

The fluid under pressure is admitted into the stock through the medium of a fitting 28 comprising a tube 29 having a tapered enlargement 30 on one end communicating with a source of fluid under pressure at the opposite end. In the present instance, air under pressure is introduced into the tube 29 through a flexible conduit 29' and the tapered enlargement 30 is adapted to be extended into the end of the stock in the delivery end of the tube 11. The enlargement 30 cooperates with the inner surface of the delivery end of the tube 11 to clamp the stock therebetween and the desired seal is maintained by a suitable spring 31. The spring 31 surrounds the tube 29 and the opposite ends of the spring respectively engage the enlargement 30 and a lever operated abutment 32, which is slidably mounted on the tube 29.

It will, of course, be understood that the tapered sealing pin 25 is inserted into the end of the stock at the delivery end of the tube 11 prior to sealing the latter end of the stock with the fitting 28. As a result, when the fluid under pressure is supplied to the stock through the fitting 28, the pin 25 is forced to a position at the opposite end of the tube 11 wherein it cooperates with the sealing chamber 24 to seal the portion of the stock in the tube 11 from the remaining length of uncured stock.

When the parts are in the above mentioned position, the valve 22 is opened to create a suction in the tube 11 and thereby cause the length of stock in the tube 11 to engage the inner surface of the latter tube. Also the valve 16 is opened to admit steam to the jacket 13 and thereby heat the tube 11 to a sufficient temperature to vulcanize or cure the length of stock in the tube 11.

During the period that the length of stock in the tube 11 is being vulcanized, the portion of the uncured stock projecting from the entrant end of the tube 11 is cooled so that it will not become tacky by heat escaping from the vulcanized chamber. For accomplishing this result a cooling medium is circulated around the sealing chamber or tube 24 in heat conducting relationship with the wall thereof. As shown in Figure 5, a jacket 33 surrounds the chamber 24 in spaced relation thereto and is provided with intake and outlet conduits 34 and 35. The intake conduit 34 communicates with a source of cooling medium, such as water and the outlet conduit 35 provides for returning the cooling medium to its source or for discharging the cooling medium in a suitable drain.

In some cases it may be advantageous to locate the sealing chamber 24 in spaced relation to the entrant end of the tube 11. In such cases an intermediate section 36 may be provided. The intermediate section is shown herein as comprising a tube 37 supported between the delivery end of the sealing tube or chamber 24 and the entrant end of the tube 11 in axial alignment with both tubes. A suitable jacket 38 surrounds the tube 37 and is provided with intake and outlet conduits 39 and 40 to enable a cooling medium to be circulated through the jacket in heat conducting relationship with the tube 37. The intermediate section 36 is also preferably formed of two halves in order to facilitate positioning the stock therein. It may be pointed out at this time that the intermediate section 36 may be formed integral with the sealing chamber 24, if desired.

At the termination of the vulcanizing operation and after the fluid under pressure admitted to the stock is shut off, the fitting 28 is removed from the end of the stock at the delivery end of the tube 11 and the stock is advanced to locate the next adjacent length of uncured stock in the tube 11. Before advancing the stock the upper halves of the sealing chamber 24 and the cooling section 36 are removed in order to facilitate pulling the stock through the tube 11.

In order to further facilitate advancing the stock through the tube 11, provision is made herein for circulating a cooling medium around the tube 11 throughout the length thereof. This cooling medium is circulated through the steam jacket 13 after the valve 16 is closed and for accomplishing this result the jacket 13 is provided with an intake conduit 41. The conduit 41 has a valve 42 therein and communicates with a source of cooling medium, such as water. This cooling medium is discharged from the jacket 13 through the conduit 17 previously described as adapted to receive the condensate from the jacket 13.

Upon reference to Figures 2 and 6 it will be noted that a sleeve 43 is supported adjacent the delivery end of the tube 11 to one side of the latter. The internal diameter of the sleeve 43 is of sufficient dimension to receive the vulcanized end of the stock and the latter end of the stock is clamped in the sleeve by the fixture 28. The arrangement is such that after the first length of stock is cured in the vulcanizing chamber 10 and the stock is advanced to locate the next length of uncured stock in the chamber, the end of the cured length of stock is inserted into the sleeve 43 through the rear end of the latter. The fixture 28 is then inserted into the sleeve through the front end of the same and is operated to clamp the stock against the inner surface of the sleeve. The fixture and the cured end of the stock remain in the above position during the period the entire length of uncured stock is vulcanized. As a result, each time one length of the continuous length of stock is undergoing the curing operation, the entire length of the cured stock is subjected to the fluid under pressure admitted through the fixture 28. This is desirable in that it provides a test for the cured length of stock.

Operation

The first step in the operation consists in removing the upper halves of the sealing chamber 24 and the cooling chamber 36. After this is accomplished a length of uncured stock is introduced into the entrant end of the tube 11 and is forced through the tube 11 until the end of the stock assumes a position flush with the delivery end of this tube. When the stock is in the above position, the upper halves of the sealing chamber 24 and cooling chamber 26 are clamped in place with the adjacent portions of the uncured stock located in their respective chambers. The sealing pin 25 is then inserted into the end of the stock at the delivery end of the tube 11 and this end of the stock is clamped against the inner surface of the tube by the fixture 28.

After the tapered sealing pin 25 has been inserted into the stock, fluid under pressure is discharged into the stock through the fixture 28. This fluid under pressure forces the tapered sealing pin 25 rearwardly through the length of stock in the tube 11 to a position in the sealing chamber 24. As pointed out above, the tube 24 of the sealing chamber is tapered to such an extent that it coacts with the sealing pin to seal the length of stock in the vulcanizing chamber from the remaining length of uncured stock. As a result, a positive internal pressure exists in the length of stock in the tube 11 and this pressure urges the stock outwardly into contact with the inner surface of the tube 11.

In order to insure intimate contacting relation between the stock and inner surface of the tube 11, air is exhausted from the interior of the tube 11 by opening the suction valve 22. After the valve 22 is opened, the valve 16 is opened to admit steam into the jacket 13 surrounding the tube 11. The steam heats the tube 11 sufficiently to cure the stock in the tube and the condensate is discharged from the jacket 13 through the conduit or drain 17.

During the vulcanizing operation cooling medium is circulated through both the sealing chamber 24 and the cooling chamber 36 so that the heat generated during the curing operation is prevented from affecting the length of uncured stock projecting beyond the entrant end of the tube 11. In other words, the heat resulting from the curing operation is prevented from making the portion of the uncured stock adjacent the entrant end of the tube 11 tacky and thereby facilitates subsequent movement of the portion of this stock through the tube 11.

After the curing operation the valve 16 is closed and the valve 42 is opened to circulate a cooling medium through the jacket 13 in heat conducting relation with the tube 11. This cooling medium has a shrinking action on the length of cured stock in the tube 11 and cools the latter so as to enable the succeeding length of uncured stock to be more readily moved into the tube 11. It will, of course, be understood that at the end of the curing period the fluid pressure entering the stock through the fixture 28 is shut off and the valve 22 is closed to discontinue the suction.

It will also be noted that upon termination of the curing period, the fixture 28 is removed from the end of the cured stock and the upper halves of both the sealing chamber 24 and the cooling chamber 36 are removed. Suitable valves (not shown) are provided to discontinue the circulation of cooling medium through the chambers when it is desired to remove the upper halves of these chambers. The portions of the stock in the lower halves of the above chambers are removed from the latter and the stock is advanced through the tube 11 to locate the next succeeding length of uncured stock in the tube 11. Upon completion of the above operation the end of the cured stock is inserted into the rear end of the sleeve 43 and the fixture 28 is inserted into the forward end of the sleeve to clamp the stock against the inner surface of the sleeve.

It will be noted that as the stock is advanced, the tapered pin 25 is moved as a unit with the stock toward the delivery end of the tube 11. After the stock has been advanced, the halves of the two chambers 24 and 36 are again clamped to their respective lower halves with the adjacent portions of the uncured stock therein so that when fluid pressure is again introduced into the cured end of the stock, the sealing pin 25 is returned to sealing engagement with the portion of the stock in the sealing chamber 24. In this connection attention is called to the fact that this fluid under pressure is supplied to the uncured length of the hose in the tube 11 through the portion previously cured and serves to test the latter.

Before the valve 16 is again opened to introduce steam in the jacket 13 for the next curing operation, the valve 42 is, of course, closed. The cooling medium supplied to the jacket 13 through the valve 42 drains out of the jacket through the conduit 17. All of the above steps are repeated to cure successive lengths of stock with the exception that after the fitting 28 is transferred from the delivery end of the tube 11 to the sleeve 43, it remains in the latter position until the entire length of stock is cured.

What I claim as my invention is:

1. The method of forming a continuous tube of vulcanizable material which comprises progressively curing predetermined lengths of uncured stock by successively introducing the predetermined lengths of stock into an elongated vulcanizing chamber and by heating the stock while in the vulcanizing chamber, and cooling the portion of the stock adjacent the entrant end of the chamber during the curing operation.

2. The method of forming a continuous tube of vulcanizable material which comprises providing a continuous length of uncured tubular stock, providing an elongated tubular vulcanizing chamber of less length than the continuous length of stock, advancing the stock through the vulcanizing chamber by a step by step movement, curing the stock against the adjacent wall of the chamber during the intervals of rest of the stock by heating the adjacent wall of the chamber, and cooling the chamber subsequent to each curing operation to facilitate moving the uncured stock into the chamber.

3. The method of forming a continuous tube of vulcanizable material which comprises providing a continuous length of uncured tubular stock, providing an elongated tubular vulcanizing chamber of less length than the continuous length of stock, advancing the stock through the vulcanizing chamber by a step by step movement, urging the length of stock in the chamber outwardly into engagement with the adjacent side wall of the chamber during the intervals of rest of the stock by providing differential pressures in the chamber and in the length of tubular stock with a preponderance of pressure in the length of stock, and curing the stock during the intervals of rest of the stock by applying heat to the length of the stock in the chamber.

4. The method of forming a continuous tube of vulcanizable material which comprises providing a continuous length of uncured tubular stock, providing a vulcanizing chamber of substantially less length than the stock, advancing the stock through the vulcanizable chamber by a step by step movement, curing the stock during the intervals of rest of the stock by heating the wall of the chamber adjacent the stock, and maintaining a positive pressure in the length of stock in the chamber during the curing operation and also in the stock previously cured by introducing fluid under pressure in the leading end of the stock.

5. The method of forming a continuous tube of vulcanizable material which comprises providing a continuous length of uncured tubular stock, providing an elongated tubular vulcanizing chamber of less length than the continuous length of stock, extending a length of uncured stock through the tubular vulcanizing chamber, sealing the interior of the portion of the stock in the chamber from the remaining portion of the uncured stock by placing a seal in the tubular stock in a position adjacent the entrant end of the chamber, urging the length of stock in the chamber against the adjacent wall of the chamber by introducing fluid under pressure into the stock through the leading end of the latter, curing the length of stock in the chamber by applying heat to said length of stock, exhausting the fluid under pressure from the length of stock in the chamber subsequent to the curing operation, introducing the adjacent uncured portion of the stock into the chamber by advancing the stock and seal to a position wherein the seal assumes a position at the delivery end of the chamber, and returning the seal to the entrant end of the chamber by again introducing fluid under pressure into the leading end of the stock.

6. The method of forming a continuous tube of vulcanizable material which comprises providing a continuous length of uncured tubular stock, providing an elongated tubular vulcanizing chamber of less length than the continuous length of stock, extending a length of uncured stock through the tubular vulcanizing chamber, sealing the interior of the portion of the stock in the chamber from the remaining portion of the uncured stock by placing a seal in the tubular stock in a position adjacent the entrant end of the chamber, urging the length of stock in the chamber against the adjacent wall of the chamber by introducing fluid under pressure into the stock through the leading end of the latter, curing the length of stock in the chamber by heating the wall of the chamber, cooling the wall of the chamber and exhausting the fluid pressure from the stock subsequent to the curing operation, introducing the adjacent uncured portion of the stock into the chamber by advancing the stock and seal therein to a position wherein the seal occupies a position at the delivery end of the chamber, and returning the seal to a position in the uncured stock at the entrant end of the chamber by again introducing fluid under pressure into the leading end of the stock.

7. In apparatus for vulcanizing tubular stock, a vulcanizing chamber having an elongated tube open at both ends and adapted to receive successive lengths of stock as the latter is moved step by step through the tube, means operating during the intervals of rest of the stock for creating a difference in pressure between the interior of the tube and the interior of the stock in the tube with a preponderance of pressure in the stock to urge the latter outwardly into intimate contact with the inner surface of the tube, and means for applying heat to the tube during the intervals of rest of the stock to vulcanize the length of stock in the tube.

8. In apparatus for vulcanizing tubular stock, a vulcanizing chamber having an elongated tube open at both ends and adapted to receive successive lengths of stock as the latter is moved step by step through the tube, means operating during the intervals of rest of the stock for creating a difference in pressure between the interior of the tube and the interior of the stock in the tube with a preponderance of pressure in the stock to urge the latter outwardly into intimate contact with the inner surface of the tube, means for circulating a heated fluid around the tube in heat conducting relation therewith during the intervals of rest of the stock to vulcanize the length of stock in the tube, and means for circulating a cooling medium around the tube subsequent to the completion of each curing operation.

9. In apparatus for vulcanizing tubular stock, a vulcanizing chamber having an elongated tube open at both ends and adapted to receive successive lengths of stock as the latter is moved step by step through the tube, means for sealing the portion of the stock in said tube from the length of uncured stock, means for admitting fluid under pressure in the portion of the stock in the tube, and means for applying heat to the tube during the intervals of rest of the stock to vulcanize the length of stock in the tube.

10. In apparatus for vulcanizing tubular stock, a vulcanizing chamber having an elongated tube open at both ends and adapted to receive successive lengths of stock as the latter is moved step by step through the tube, a tapered sealing chamber at the entrant end of the tube adapted to receive the adjacent portion of the uncured stock, a tapered pin insertable into the leading end of the stock, means for admitting fluid under pressure into the leading end of the stock to force the pin rearwardly to a position where it coacts with the tapered chamber to seal the length of stock in the tube from the remaining length of uncured stock, and means for applying heat to the tube during the intervals of rest of the stock to vulcanize the stock in the tube.

11. In apparatus for vulcanizing tubular stock, a vulcanizing chamber having an elongated tube open at both ends and adapted to receive successive lengths of stock as the latter is moved step by step through the tube, a tapered sealing chamber at the entrant end of the tube adapted to receive the adjacent proportion of the uncured stock, a tapered pin located in the length of stock in the sealing chamber and coacting with the sealing chamber to seal the length of stock in the tube from the remaining length of uncured stock, said pin being movable with the stock as the latter is advanced through the tube, means operable after each movement of the stock to admit fluid under pressure into the stock through the leading end of the stock and force the pin back into coacting relationship with the tapered chamber, means for applying heat to the tube during the intervals of rest of the stock to vulcanize the length of stock in the tube, and means for circulating a cooling medium around the stock in the sealing chamber.

RAYMOND ORLEY BROOKS.